US009307523B2

(12) United States Patent
Gomadam

(10) Patent No.: US 9,307,523 B2
(45) Date of Patent: Apr. 5, 2016

(54) REFERENCE SIGNAL DESIGN FOR COORDINATED MULTIPOINT TRANSMISSION

(71) Applicant: Marvell World Trade Ltd., St. Michael (BB)

(72) Inventor: Krishna Srikanth Gomadam, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 129 days.

(21) Appl. No.: 13/719,241

(22) Filed: Dec. 19, 2012

(65) Prior Publication Data

US 2013/0156001 A1 Jun. 20, 2013

Related U.S. Application Data

(60) Provisional application No. 61/578,207, filed on Dec. 20, 2011.

(51) Int. Cl.
*H04W 72/04* (2009.01)
*H04L 25/03* (2006.01)

(52) U.S. Cl.
CPC ..... *H04W 72/0406* (2013.01); *H04L 25/03955* (2013.01)

(58) Field of Classification Search
CPC .................. H04L 25/03955; H04W 72/0406; H04W 72/04; H04W 4/00; H04J 3/00
USPC .................. 370/330, 328–329, 336
See application file for complete search history.

(56) References Cited

U.S. PATENT DOCUMENTS

| 8,300,587 | B2 | 10/2012 | Chmiel et al. | |
| 8,923,249 | B2 | 12/2014 | Kim et al. | |
| 2007/0147333 | A1* | 6/2007 | Makhijani | 370/347 |
| 2009/0190687 | A1* | 7/2009 | Moon et al. | 375/267 |
| 2009/0268630 | A1 | 10/2009 | Yellin et al. | |
| 2010/0008445 | A1* | 1/2010 | Khan | 375/296 |
| 2010/0271968 | A1* | 10/2010 | Liu et al. | 370/252 |

(Continued)

FOREIGN PATENT DOCUMENTS

| WO | 2011021852 | A2 | 2/2001 |
| WO | 2011097523 | A1 | 8/2011 |
| WO | 2011114079 | A1 | 9/2011 |
| WO | 2011119140 | A2 | 9/2011 |

OTHER PUBLICATIONS

International Application PCT/IB2012/057248 Search Report dated May 8, 2013.

(Continued)

*Primary Examiner* — Chandrahas Patel
*Assistant Examiner* — Lan Huong Truong

(57) ABSTRACT

A method includes controlling a set of transmission points, which are configured to operate in accordance with a Coordinated Multipoint (CoMP) transmission scheme, to simultaneously transmit a composite Reference Signal (RS) to a mobile communication terminal. Feedback, which is indicative of a response of a composite communication channel between the transmission points and the terminal, is received from the terminal. The feedback is estimated in the terminal based on the composite RS received in the terminal from the transmission points. Subsequent transmission from the transmission points is configured based on the received feedback.

20 Claims, 3 Drawing Sheets

(56) References Cited

U.S. PATENT DOCUMENTS

| | | |
|---|---|---|
| 2010/0272032 A1* | 10/2010 | Sayana et al. ............... 370/329 |
| 2010/0303034 A1 | 12/2010 | Chen et al. |
| 2010/0322171 A1 | 12/2010 | Dekorsy et al. |
| 2010/0322351 A1 | 12/2010 | Tang et al. |
| 2011/0032838 A1 | 2/2011 | Liu et al. |
| 2011/0034175 A1* | 2/2011 | Fong et al. ................... 455/450 |
| 2011/0243066 A1 | 10/2011 | Nayeb Nazar et al. |
| 2011/0268007 A1* | 11/2011 | Barany et al. ............... 370/312 |
| 2011/0273994 A1 | 11/2011 | Lin |
| 2011/0274063 A1 | 11/2011 | Li |
| 2012/0051265 A1* | 3/2012 | Shen et al. ................... 370/254 |
| 2012/0106595 A1 | 5/2012 | Bhattad et al. |
| 2013/0034064 A1 | 2/2013 | Nam et al. |
| 2013/0039332 A1 | 2/2013 | Nazar et al. |
| 2013/0039349 A1* | 2/2013 | Ebrahimi Tazeh Mahalleh et al. ............... 370/336 |
| 2013/0114427 A1* | 5/2013 | Maattanen et al. ........... 370/252 |
| 2013/0114430 A1* | 5/2013 | Koivisto et al. ............. 370/252 |
| 2014/0056156 A1* | 2/2014 | Jongren ....................... 370/252 |

OTHER PUBLICATIONS

International Application PCT/IB2012/057455 Search Report dated May 13, 2013.

Zhang et al., U.S. Appl. No. 61/558,405, filed Nov. 10, 2011.

Gomadam et al., U.S. Appl. No. 13/733,150, filed Jan. 3, 2013.

3GPP TS 36.211, "Technical Specification Group Radio Access Network; Evolved Universal Terrestrial Radio Access (E-UTRA); Physical Channels and Modulation (release 10)", V10.3.0, Sep. 2011.

3GPP TS 36.212, "Technical Specification Group Radio Access Network; Evolved Universal Terrestrial Radio Access (E-UTRA); Multiplexing and channel coding (release 10)", V10.3.0, Sep. 2011.

3GPP TR 36-819, "Technical Specification Group Radio Access Network; Coordinated multi-point operation for LTE physical layer aspects (release 11)", V11.0.0, Sep. 2011.

U.S. Appl. No. 13/610,908, filed Sep. 12, 2012.

U.S. Appl. No. 13/610,908 Office Action dated Jun. 27, 2014.

U.S. Appl. No. 13/610,908 Office Action dated Mar. 2, 2015.

* cited by examiner

REFERENCE SIGNAL DESIGN FOR COORDINATED MULTIPOINT TRANSMISSION

CROSS-REFERENCE TO RELATED APPLICATIONS

This application claims the benefit of U.S. Provisional Patent Application 61/578,207, filed Dec. 20, 2011, whose disclosure is incorporated herein by reference.

FIELD OF THE DISCLOSURE

The present disclosure relates generally to communication systems, and particularly to methods and systems for channel feedback in wireless communication systems.

BACKGROUND

In some Multiple-Input Multiple-Output (MIMO) communication systems, multiple cells use Cooperative Multipoint (CoMP) transmission schemes for coordinating downlink MIMO transmissions to User Equipment (UEs). Third Generation Partnership Project (3GPP) Long Term Evolution-Advanced (LTE-A) systems, for example, use or contemplate the use of multiple CoMP modes such as Dynamic Point Selection (DPS), Dynamic Point Blanking (DPB), Cooperative beamforming (CB) and Joint Processing (JP).

CoMP modes used in LTE-A are specified, for example, in "3rd Generation Partnership Project; Technical Specification Group Radio Access Network; Coordinated multi-point operation for LTE physical layer aspects (Release 11)," 3GPP TR 36.819, version 11.0.0, September, 2011, which is incorporated herein by reference.

When using CoMP, the cooperating cells typically configure their transmissions based on channel feedback provided by the UEs.

The description above is presented as a general overview of related art in this field and should not be construed as an admission that any of the information it contains constitutes prior art against the present patent application.

SUMMARY

An embodiment that is described herein provides a method including controlling a set of transmission points, which are configured to operate in accordance with a Coordinated Multipoint (CoMP) transmission scheme, to simultaneously transmit a composite Reference Signal (RS) to a mobile communication terminal. Feedback, which is indicative of a response of a composite communication channel between the transmission points and the terminal, is received from the terminal. The feedback is estimated in the terminal based on the composite RS received in the terminal from the transmission points. Subsequent transmission from the transmission points is configured based on the received feedback.

In an embodiment, controlling the set includes controlling multiple transmission points that are located at different geographical locations. In a disclosed embodiment, controlling the transmission points to transmit the composite RS includes controlling the transmission points to transmit respective reference signals in a single pattern of time-frequency Resource Elements (REs). In an example embodiment, receiving the feedback includes receiving an indication of a preferred precoding matrix, which is selected by the terminal from a codebook that is specified for single-transmission-point channels.

In some embodiments, controlling the transmission points includes transmitting two or more composite RSs, corresponding to respective different CoMP hypotheses, each CoMP hypothesis corresponding to a respective CoMP mode and a respective subset of the transmission points. In an embodiment, receiving the feedback and configuring the subsequent transmission include receiving the feedback relating to the two or more composite RSs, and selecting a CoMP hypothesis for transmitting the subsequent transmission based on the received feedback relating to the respective different CoMP transmission hypotheses.

In another embodiment, receiving the feedback includes receiving first feedback having a first data size for a first composite RS, and receiving second feedback having a second data size, different from the first data size, for a second composite RS. In yet another embodiment, transmitting the two or more composite RSs includes transmitting each subset of the composite RSs in a separate sub-frame of a communication protocol used between the transmission points and the terminal.

In still another embodiment, transmitting the two or more composite RSs includes assigning at least one of the composite RSs for interference measurement by the terminal. In an example embodiment, receiving the feedback includes receiving interference estimates for at least two respective time-frequency Resource elements (REs).

In some embodiments, receiving the feedback includes receiving an indication of a partial subset of the composite RSs for which the feedback is estimated by the terminal. In an embodiment, receiving the indication includes receiving a jointly-encoded indication of the partial subset of the composite RSs and of a transmission rank associated with the feedback, and extracting the partial subset from the jointly-encoded indication. In a disclosed embodiment, transmitting the composite RS includes sending to the terminal signaling information that specifies time-frequency Resource Elements (REs) containing the composite RS.

There is additionally provided, in accordance with an embodiment that is described herein, apparatus including an interface and at least one processor. The interface is configured to communicate with a set of transmission points that operate in accordance with a Coordinated Multipoint (CoMP) transmission scheme. The processor is configured to control the transmission points to simultaneously transmit a composite Reference Signal (RS) to a mobile communication terminal, to receive from the terminal feedback, which is estimated in the terminal based on the composite RS received in the terminal, the feedback being indicative of a response of a composite communication channel between the transmission points and the terminal, and to configure subsequent transmission from the transmission points based on the received feedback.

The present disclosure will be more fully understood from the following detailed description of the embodiments thereof, taken together with the drawings in which:

DETAILED DESCRIPTION OF EMBODIMENTS

Figure 1:
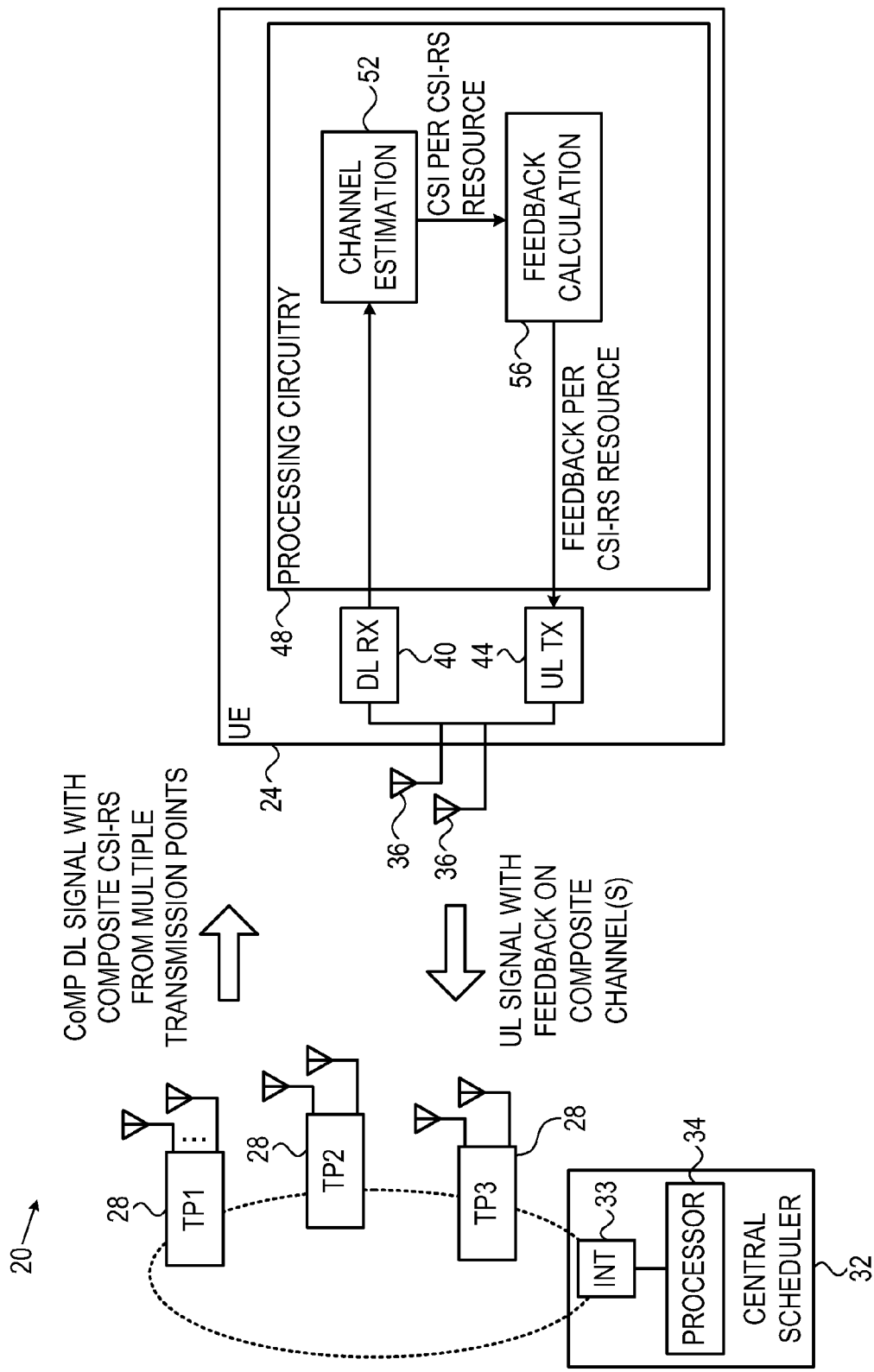
FIG. 1 is a block diagram that schematically illustrates a MIMO communication system that uses CoMP, in accordance with an embodiment that is described herein.

Embodiments that are described herein provide improved methods and systems for Coordinated Multipoint (CoMP) communication between multiple base-stations (e.g., eNode-B or eNB in 3GPP LTE) and mobile communication terminals. Sometimes, an eNB in a CoMP communication system is also referred as a Transmission Point (TP). In some CoMP scenarios, multiple TPs that are located in separate geographical locations transmit to a given terminal. It is possible to have TPs collocated or quasi-collocated. In the disclosed embodiments, geographical separated TPs are used as example.

In the disclosed embodiments, multiple cooperating TPs transmit to a terminal the same reference signals (RS), which the terminal uses to estimate Channel State Information (CSI). Typically, the multiple TPs transmit the same RS coherently in the same pattern of time-frequency Resource Elements (REs). The simultaneously-transmitted reference signals are referred to herein as a composite CSI-RS, or composite RS for brevity. The pattern of REs used for transmitting a given composite CSI-RS is referred to herein as a composite CSI-RS resource. The term "CSI-RS" typically refers to the value of the reference signal, while the term "CSI-RS resource" typically refers to the patters of time-frequency REs in which the CSI-RS is transmitted.

The terminal is typically configured to receive each CSI-RS resource, estimate the response of the communication channel over which the CSI-RS resource was received, and then send to the TPs feedback that is indicative of the estimated channel response. When the CSI-RS is a composite CSI-RS originating from multiple TPs, the terminal actually measures the composite channel from the multiple antennas of the multiple non-collocated TPs. This sort of measurement is valuable, for example, for configuring subsequent Joint Processing (JP) transmissions to the terminal.

Coordination between the TPs with respect to transmission of the composite CSI-RS, as well as processing of the resulting feedback, is performed by a processor in one of the TPs, in an embodiment, or alternatively in a central scheduler.

Transmitting composite CSI-RS resources to a terminal from multiple non-collocated TPs, and obtaining feedback from the terminal for the corresponding composite channel, is a powerful technique that can be used for various purposes. In an example embodiment, the TPs transmit to a terminal using different transmission CoMP modes (e.g., DPS, DPB, JP, CB) and/or using different subsets of the TPs, in order to test the performance of each such hypothesis. In each hypothesis, the TPs use a different respective CSI-RS resource. The terminal returns channel feedback for each CSI-RS resource, usually without being aware of the underlying hypotheses.

In this manner, the processor (e.g., the central scheduler) is able to evaluate and select various CoMP hypotheses (e.g., combinations of CoMP transmission modes and/or subsets of TPs) without having to pre-configure the terminal. The terminal is not required to distinguish whether a given CSI-RS is transmitted from multiple transmission points or from a single transmission point—The involvement of the terminal typically amounts to measuring the channel response per CSI-RS resource.

FIG. 1 is a block diagram that schematically illustrates a Cooperative Multipoint (CoMP) communication system 20 that uses Multiple-Input Multiple-Output (MIMO) transmission, in accordance with an embodiment that is described herein. In the present example, system 20 operates in accordance with Third Generation Partnership Project (3GPP) Long Term Evolution-Advanced (LTE-A) specifications. In alternative embodiments, system 20 may operate in accordance with any other suitable communication protocol in which TPs coordinate transmission with one another, such as, for example, WiMAX.

In the example embodiment of FIG. 1, system 20 comprises a mobile communication terminal 24 (referred to in LTE-A terminology as User Equipment—UE) and three TPs 28 (base stations or transmission points) denoted TP1, TP2 and TP3. The terms cell, base station and Transmission Point (TP) are used interchangeably herein. The choice of a single UE and three TPs is made purely by way of example. In real-life configurations, system 20 typically comprises a large number of TPs, some of which may be collocated, and a large number of terminals. Each UE 24 comprises, for example, a cellular phone, a wireless-enabled computing device or any other suitable type of communication terminal.

TPs 28 cooperate with one another in transmitting precoded (i.e., beamformed) signals to UEs 24. A group of TPs that cooperate in this manner, such as TP1, TP2 and TP3, is referred to as a cooperating set. In various embodiments, TPs 28 may use CoMP modes such as DPS, DPB, JP, CB, and possibly alternate between different modes over time.

In the present embodiment, system 20 comprises a central scheduler 32, which schedules the transmissions of the various TPs to the various UEs, and calculates precoding vectors (i.e., sets of complex weights to be applied to the signals transmitted via the respective transmit antennas of the TPs) to be applied by the TPs, as well as the Modulation and Coding Scheme (MCS) of the CoMP transmissions. In some embodiments the central scheduler also selects the appropriate CoMP mode, and the TP or TPs in the set that will transmit to a UE. Scheduler 32 comprises an interface 33 for communicating with TPs 28, and a processor that carries out the methods described herein.

Central scheduler 32 typically selects the CoMP mode, the transmitting TP or TPs, the precoding vectors and/or the MCS, based on channel feedback that is received from the UEs. In alternative embodiments, some or all of the functions of central scheduler are carried out by a processor in one of the TPs, or by any other suitable processor. The description that follows refers to the central scheduler as performing the disclosed techniques, for the sake of clarity. In alternative embodiments, however, the disclosed techniques can be carried out using any suitable processor or multiple processors.

In the embodiment of FIG. 1, UE 24 comprises one or more antennas 36, a downlink receiver (DL RX) 40, an uplink transmitter (UL TX) 44, and processing circuitry 48. Receiver 40 receives downlink signals from TPs 28 via antennas 36. Processing circuitry 48 processes the received signals. In the present embodiment, processing circuitry 48 comprises a channel estimation module 52, which uses the received downlink signals to estimate the response of the communication channel per each CSI-RS resource. A feedback calculation module 56 calculates channel feedback based on the channel response estimated by module 52.

The UE configuration shown in FIG. 1 is an example configuration, which is depicted in a highly simplified manner solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 40, transmitter 44 and processing circuitry 48, are implemented in hardware, such as implementing receiver 40 and/or transmitter 44 using one or more Radio Frequency Integrated Circuits (RFICs), or implementing processing circuitry 48 using one or more Field-Programmable Gate Arrays (FPGAs) or Application-Specific Integrated Circuits (ASICs). In alternative embodiments, certain elements of UE 24 are implemented in software, or using a combination of hardware and software elements.

In some embodiments, certain UE elements, such as certain elements of processing circuitry 48, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

Typically, TPs 28 transmit Channel State Information Reference Signals (CSI-RS) to terminal 24, in order to enable the terminal to estimate the response of the communication channel and return appropriate channel feedback. In the disclosed embodiments, two or more of TPs 28 transmit CSI-RS in the same CSI-RS resource jointly to a given terminal. This jointly-transmitted CSI-RS, possibly in addition to CSI-RS from a single transmission point, is referred to herein as a composite CSI-RS or composite RS. In DPS, the set of TPs that transmits the composite CSI-RS comprises a single TP.

In this sort of transmission, two or more TPs typically transmit the same or different CSI-RS in the same CSI-RS resource (i.e., in the same pattern of time-frequency Resource Elements (REs)). In an embodiment, the CSI-RS values (transmitted in the same CSI-RS resource) differ from one another, e.g., a respective different CSI-RS for each antenna port.

The TPs may use the same Cell identifier (Cell ID) or different cell IDs. The joint transmission is typically coordinated by central scheduler 32. Terminal 24 receives the composite CSI-RS, estimates the channel response based on the received composite CSI-RS, and returns channel feedback that is indicative of the estimated channel response.

Figure 2:
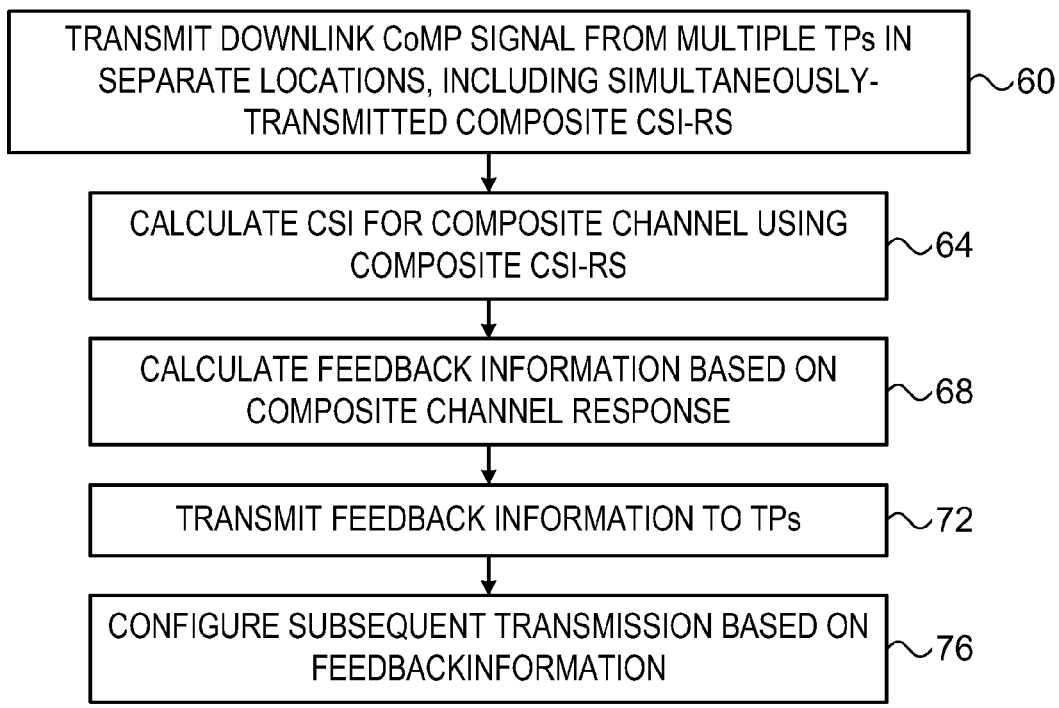
FIG. 2 is a flow chart that schematically illustrates a method for channel feedback in a communication system that uses CoMP, in accordance with an embodiment that is described herein.

FIG. 2 is a flow chart that schematically illustrates a method for channel feedback in system 20, in accordance with an embodiment that is described herein. The method begins with two or more of TPs 28, located in different geographical locations, transmitting a downlink CoMP signal including a composite CSI-RS, at a downlink transmission operation 60. In various CoMP scenarios, TPs 28 may comprise various types of base stations such as macro-cells, pico-cells as well as combinations of different base station types.

DL RX 40 in terminal 24 receives the CoMP signal including the composite CSI-RS. Channel estimation module 52 in terminal 24 estimates the response of the communication channel, e.g., CSI, based on the received CSI-RS, at a CSI estimation operation 64.

Feedback calculation module 56 calculates feedback that is indicative of the estimated channel response, at a feedback calculation operation 68. In various embodiments, the feedback comprises, for example, Precoding Matrix Indicator (PMI), Channel Quality Indicator (CQI) and/or any other suitable measure that is indicative of the communication channel.

Since the composite CSI-RS is transmitted simultaneously from the multiple non-collocated TPs, the channel response estimated by module 52 corresponds to the composite communication channels from the multiple transmit antennas of the multiple non-collocated TPs to the terminal. The feedback calculated by module 56 corresponds to this composite channel, as well. Typically, however, modules 52 and 56 do not distinguish between CSI-RS received from a single transmission point and composite CSI-RS received from multiple transmission points. As such, the disclosed technique can be used with legacy terminals without requiring modification.

In some embodiments, system 20 (including possibly legacy terminals) uses codebook-based feedback such as the 8tx codebook scheme specified in the LTE-A specifications. In some embodiments, as will be described below, the 8tx codebook is reused in CoMP for reporting feedback relating to composite, multi-TP channels.

Processing circuitry 48 of terminal 24 provides the feedback to UL TX 44, and the UL TX transmits the feedback over the uplink to TPs 28 and scheduler 32, at a feedback transmission operation 72. Scheduler 32 configures subsequent transmissions based on the feedback, at a transmission configuration operation 76. The central scheduler uses the feedback, for example, for setting precoding (beamforming) schemes, for scheduling transmissions, for setting subsequent CoMP modes, or for configuring the subsequent downlink transmissions in any other suitable way.

In some embodiments, system 20 uses the composite CSI-RS technique for evaluating different CoMP schemes for communicating with terminal 24. Each CoMP scheme, referred to herein as a CoMP hypothesis, specifies a respective CoMP transmission mode (e.g., DPS, DPB, JP, CB) and a respective subset of the TPs (possibly all the TPs) to be used for transmitting to the terminal.

In this embodiment, scheduler 32 assigns a different composite CSI-RS resource for each respective CoMP hypothesis. TPs 28 transmit CoMP transmissions to terminal 28 using the various CoMP hypotheses, with each hypothesis transmitted using the respective composite CSI-RS resource. The terminal (which is typically unaware of the hypotheses evaluation process) estimates the channel response and returns feedback separately per each CSI-RS resource. Based on the feedback, scheduler 32 selects a CoMP scheme (e.g., CoMP mode and subset of TPs) for configuring subsequent CoMP transmissions to the terminal.

Figure 3:
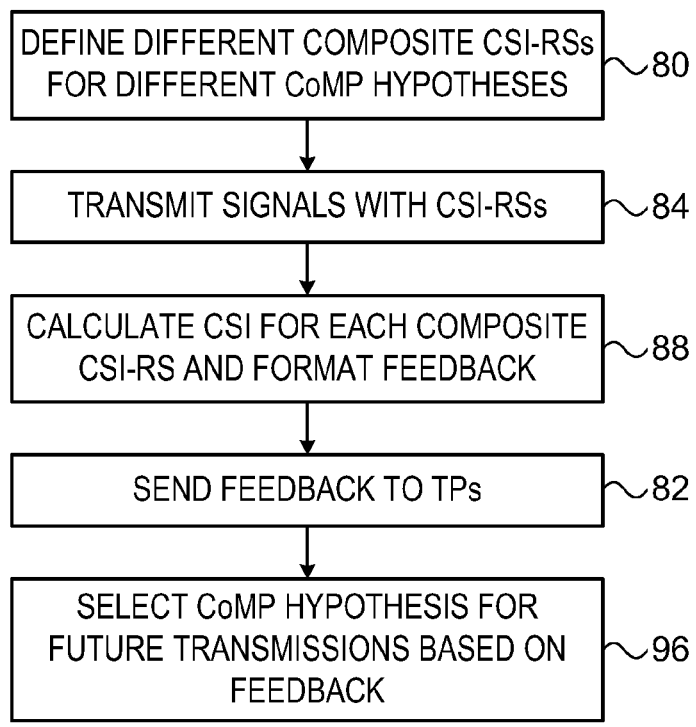
FIG. 3 is a flow chart that schematically illustrates a method for selecting a CoMP scheme, in accordance with an embodiment that is described herein.

FIG. 3 is a flow chart that schematically illustrates a method for selecting a CoMP scheme, in accordance with an embodiment that is described herein. The method begins with central scheduler 32 defining multiple CoMP hypotheses for evaluation, at a hypothesis definition operation 80. Each hypothesis corresponds to a respective CoMP transmission mode (e.g., DPS, DPB, JP, CB) and a respective subset of the TPs (possibly all the TPs) to be used for transmitting to the terminal.

Typically although not necessarily, the total number of transmit antenna ports in each hypothesis, aggregated over all participating transmission points, is set to 2, 4 or 8. For each hypothesis to be evaluated, scheduler 32 assigns a respective different composite CSI-RS resource.

TPs 28 transmit downlink transmissions to terminal 24 in accordance with the respective CoMP hypotheses, at a hypothesis transmission operation 84. For testing each hypothesis, the subset of TPs defined in the hypothesis transmits the composite CSI-RS defined in the hypothesis using the CoMP transmission mode defined in the hypothesis.

Terminal 24 receives the downlink transmissions, estimates the channel response per CSI-RS resource, and calculates respective feedback per CSI-RS resource, at a hypothesis feedback calculation operation 88. The terminal transmits the feedback per CSI-RS resource to the TPs, at a hypothesis feedback transmission operation 92. Thus, central scheduler 32 is provided with separate feedback corresponding to each CoMP hypothesis.

Based on the feedback, scheduler 32 selects the preferable CoMP scheme to be used in subsequent downlink transmissions to the terminal. In an example embodiment, each feedback comprises a CQI for the respective CoMP hypothesis, and scheduler 32 selects the CoMP scheme having the best CQI for subsequent transmission to the terminal. Alternatively, scheduler 32 may configure subsequent transmissions to the terminal based on the feedback in any other suitable way.

In some embodiments, system 20 (including possibly legacy terminals) uses codebook-based feedback such as the 8tx codebook scheme specified in the LTE-A specifications, which is specified for single-TP channels. In an example scheme, the signaling from the UE to the base station is based on (up to) an 8-bit codebook having 256 precoding matrices. In some embodiments, scheduler 32 applies the disclosed techniques while reusing the existing single-TP codebook and signaling mechanism. In other words, the existing codebook is used for reporting channel feedback for the multi-TP composite channels corresponding to the composite CSI-RS resources. This reuse is typically transparent to the terminal.

In an example embodiment, TPs 28 comprise two Macro cells (denoted "Macro 1" and "Macro 2") each having four transmit antennas, and a Pico cell having two transmit antennas. In this embodiment, scheduler 32 specifies and evaluates four CoMP hypotheses according to the following table:

TABLE 1

Example set of CoMP hypotheses for two Macro cells and one Pico cell

| CoMP hypothesis, CSI-RS resource | CoMP mode | Total # of ports | # of ports from Macro 1 | # of ports from Macro 2 | # of ports from Pico |
|---|---|---|---|---|---|
| #1 | DPS | 2 | 0 | 0 | 2 |
| #2 | DPS | 4 | 4 | 0 | 0 |
| #3 | JT | 4 | 2 | 0 | 2 |
| #4 | JT | 8 | 4 | 4 | 0 |

In accordance with Table 1, when testing hypothesis #1, only the Pico cell transmits using its two antennas using DPS and using CSI-RS resource #1. As another example, when testing hypothesis #3, The first Macro cell transmits using two antennas and the Pico cell transmits using its two antennas, all using JT and using CSI-RS resource #3. This scheme enables system 20 to evaluate various DPS and JT schemes, transparently to the terminal.

In another example embodiment, TPs 28 comprise one Macro cell having four transmit antennas, and for Pico cells (denoted P1 . . . P4) each having two transmit antennas. In this embodiment, scheduler 32 specifies and evaluates four CoMP hypotheses according to the following table:

TABLE 2

Example set of CoMP hypotheses for one Macro cells and four Pico cells

| CoMP hypothesis, CSI-RS resource | CoMP mode | Total # of ports | Macro cell # of ports | Pico cell # of ports | | | |
|---|---|---|---|---|---|---|---|
| | | | | P1 | P2 | P3 | P4 |
| #1 | DPS | 4 | 4 | 0 | 0 | 0 | 0 |
| #2 | DPS | 2 | 0 | 2 | 0 | 0 | 0 |
| #3 | DPS | 2 | 0 | 0 | 2 | 0 | 0 |
| #4 | DPS | 2 | 0 | 0 | 0 | 2 | 0 |
| #5 | DPS | 2 | 0 | 0 | 0 | 0 | 2 |
| #6 | JT | 4 | 2 | 2 | 0 | 0 | 0 |
| #7 | JT | 4 | 2 | 0 | 2 | 0 | 0 |
| #8 | JT | 4 | 2 | 0 | 0 | 2 | 0 |
| #9 | JT | 4 | 2 | 0 | 0 | 0 | 2 |
| #10 | JT | 8 | 4 | 2 | 2 | 0 | 0 |
| #11 | JT | 8 | 4 | 0 | 0 | 2 | 2 |

In this embodiment, the CSI-RS resources are not necessarily all mutually-orthogonal. For example, CSI-RS resources #2 and #6 can overlap. Thus, in an embodiment, terminal 24 is configured to measure a subset of the CSI-RS resources, e.g., {#1, #2, #6 and #10}. Relaxing the constraint of mutual orthogonality enables, for example, reduction of signaling overhead and high flexibility in the choice and allocation of CSI-RS resources.

In some embodiments, scheduler 32 defines the CSI-RS resources such that two or more terminals 24 share a given CSI-RS resource. This technique reduces signaling overhead, and is useful since the transmission properties of terminals in a given geographical location are similar for the same set of CSI-RS resources. Generally, however, it is possible to share CSI-RS resources between terminals that are not necessarily in similar geographical locations.

Another way of reducing signaling overhead is by making two or more of the CoMP hypotheses (and the corresponding CSI-RS resources) non-orthogonal. In Table 2, for example, hypothesis #2 is completely contained in hypothesis #6 (i.e., the set of ports participating in hypothesis #2 is contained in the set of ports participating hypothesis #6). Generally, however, partial overlaps between CoMP hypotheses are also feasible.

In some embodiments, scheduler 32 defines CSI-RS resources for Coordinated Beamforming (CB) and Dynamic Blanking (DB) CoMP modes. The CB and DB CoMP modes typically assume little or no interference from the corresponding TP. In order to capture such hypotheses in the CSI-RS definitions, the TPs should perform some muting during Physical Downlink Shared Channel (PDSCH) transmission. In Table 2, for example, if a given hypothesis defines dynamic point selection (DPS) of P1 with dynamic blanking (DB) of P2, then the interference assumed by terminal 24 should not include interference from P2 during CQI feedback. This technique can still be carried out in a transparent fashion, for example by using REs that are dedicated for interference measurement. Furthermore, even without any support for CB/DB in the CSI-RS configuration, CS and DB can still be used for PDSCH transmission. In the latter embodiment, small performance degradation may be incurred since the terminal CQI calculation does not assume CB/DB, i.e., lack of interference.

When defining the CSI-RS resources and the associated feedback, scheduler 32 may configure the measurement set, the reporting set and the transmission set of terminal 24 in various ways. The measurement set is defined as the set of transmission points (or CSI-RS resources) for which the terminal measures CSI, Reference Signal Received Power (RSRP) and/or Reference Signal Received Quality (RSRQ). The reporting set is defined as the set of transmission points (or CSI-RS resources) for which the terminal reports CSI feedback. The transmission set is defined as the set of transmission points that central scheduler 32 uses for PDSCH transmission to the terminal.

In one example embodiment, the size of the reporting set is smaller than the size of the measurement set. In this embodiment, the terminal typically down-selects the CSI-RS resources configured by scheduler 32 for feedback. In an example scenario, scheduler 32 configures four CSI-RS resources and the terminal selects two of these CSI-RS resources for feedback. In another example embodiment, the size of the reporting set is equal to the size of the measurement set. In this embodiment, the terminal reports CSI information for all the configured CSI-RS resources.

As can be seen from the above examples, in some embodiments terminal 24 does not always return feedback for all CSI-RS resources. Thus, in some embodiments, feedback calculation module 56 in terminal 24 indicates the identities of the CSI-RS resources for which feedback is reported, as part of the feedback transmission. These identities are referred to herein as CSI-RS Resource Indicators (CRI).

In an example embodiment, feedback calculation module 56 encodes the CRI jointly with the reported Rank Indicator (RI—an indicator that indicates the number of spatial streams for which the feedback is reported). Upon receiving the jointly-encoded CRI and RI, scheduler 32 extracts the CRI from the jointly-encoded CRI and RI, and thus determines the CSI-RS resources for which feedback is provided by the terminal.

Figure 4:
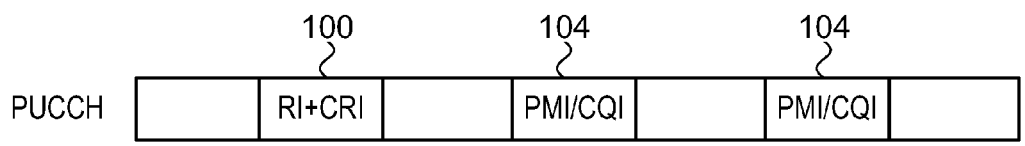
FIG. 4 is a diagram that schematically illustrates a timing configuration of feedback transmissions, in accordance with an embodiment that is described herein.

FIG. 4 is a diagram that schematically illustrates a timing configuration of feedback transmissions on the Physical Uplink Control Channel (PUCCH), in accordance with an embodiment that is described herein. In this embodiment, terminal 24 transmits a sequence of uplink sub-frames to TPs 28. Transmitter 44 of terminal 24 transmits the jointly-encoded CRI and RI in sub-frames 100, and other components of the feedback, such as PMI and CQI feedback, in other sub-frames 104.

In this embodiment, each joint CRI and RI feedback report is assigned a maximum of five bits, and each PMI/CQI feedback report is assigned a maximum of eleven bits. Alternatively, any other suitable feedback encoding and bit allocations can be used.

Because of the limited PUCCH capacity, it is sometimes impossible for terminal 24 to include feedback for more than one CSI-RS resource per PUCCH slot. Moreover, because of computational power constraints, the terminal is typically limited in the rate it is able to compute CQI/PMI/RI feedback for different TPs. Thus, in some embodiments, the PUCCH slots that report feedback for different CSI-RS resources are separated in time, e.g., in different uplink sub-frames of the protocol. In addition, the downlink slots for transmitting different CSI-RS resources are also separated in time, e.g., in different downlink sub-frames of the protocol.

Figure 5:
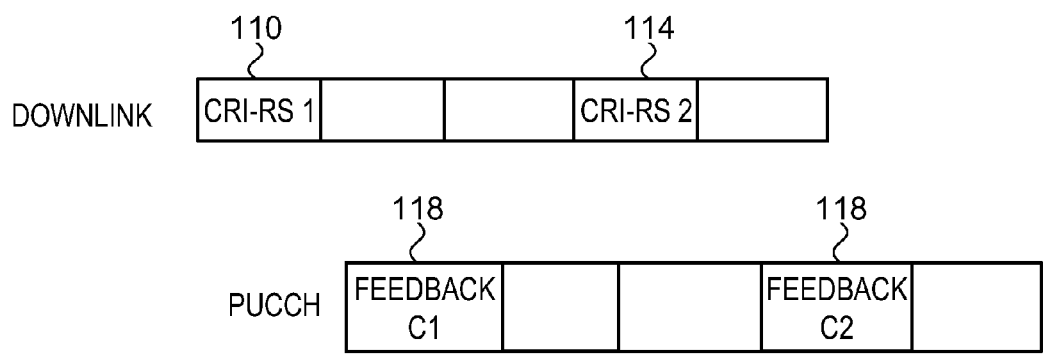
FIG. 5 is a diagram that schematically illustrates a timing configuration of reference signals and feedback transmissions, in accordance with an embodiment that is described herein.

FIG. 5 is a diagram that schematically illustrates a timing configuration of CSI-RS resources and feedback transmissions, in accordance with an alternative embodiment that is described herein. This example demonstrates the time separations described above. The top of FIG. 5 shows downlink slots 110 and 114 in every third downlink sub-frame that are used for transmitting CSI-RS resources. The bottom of FIG. 5 shows PUCCH slots 118 in every third uplink sub-frame that are used for transmitting feedback reports for TPs denoted C1 and C2. In alternative embodiments, the CSI-RS resources and feedback reports may be scheduled in any other suitable manner.

In some embodiments, scheduler 32 notifies terminal 32 of a given CSI-RS resource by signaling the pattern of time-frequency REs in which this CSI-RS is transmitted. In an embodiment, the parameters that define the pattern are denoted antennaPortsCount, Pc, resourceConfig and subframeConfig. Parameter antennaPortsCount gives the number of transmit antenna ports from which the CSI-RS is transmitted. Parameter Pc gives the power ratio between the CSI-RS and the Physical Data Shared Channel (PDSCH). Parameter resourceConfig gives the RE pattern of the CSI-RS within the sub-frame. Parameter subframeConfig gives the periodicity (e.g., T=5 to 80 mS) and offset (e.g., 0 to T−1) of the sub-frames in which the CSI-RS is transmitted.

Typically, the parameters antennaPortsCount, Pc, resourceConfig and subframeConfig are configurable independently for each CSI-RS resource. Typically, different CSI-RS resources have different offset values in the subframeConfig field, so as to define their transmissions in different sub-frames. Typically, there is no constraint as to the RI, CQI and PMI feedback across the CSI-RS resources.

In some embodiments, the feedback differs in data size for different CSI-RS resources. In an example embodiment, the feedback relating to the two strongest transmission points is assigned a certain data size, and the feedback relating to the other transmission points is assigned a smaller data size.

In the embodiments described above, terminal 24 transmits the feedback over the PUCCH. In alternative embodiments, however, the terminal sends the feedback jointly over the PUCCH and Physical Uplink Shared Channel (PUSCH), for example in order to achieve higher CQI accuracy.

In some embodiments, for the case of eight transmit antennas (8Tx), the terminal typically uses a single-component codebook of precoding matrices, rather than separate codebooks for rapidly-varying and slowly-varying signal components. These separate codebooks are sometimes referred to in LTE terminology as W1 and W2 codebooks. Thus, in some embodiments, the terminal calculates and feeds-back both W1 and W2 components of the feedback in every feedback report. In some embodiments, the currently-used codebook may be restricted to a subset of the full 8Tx codebook.

As explained above, in some scenarios multiple transmission points use the same cell ID when transmitting CoMP transmissions to terminal 24. In such scenarios, the terminal cannot estimate the level of interference by measuring Common Reference Signals (CRS), since the CRS is derived from the cell ID. Thus, in some embodiments, scheduler 32 dedicates one or more REs for interference measurements by the terminal. In an embodiment, the interference measurement REs are specified in terms of a dedicated CSI-RS resource, which is used by the terminal for measuring interference.

In an example embodiment, the number of ports in the interference measurement CSI-RS resource is restricted to one or two, regardless of the number of ports used in other CSI-RS resources. The CSI-RS pattern defined in the resourceConfig (the field indicating the pattern of CSI_RS used within a sub-frame) can be used for mapping the interference measurement REs. Alternatively, the interference measurement CSI-RS resource may be defined on any suitable number of ports.

Typically, the periodicity of interference measurement REs should be higher than that of the CSI-RS. In an example embodiment, additional values are added to the subFrameConfig field in the signaling information, in order to refine its time granularity. For example, the granularity can be set to include 1 mS, 2 mS and 3 mS rather than 5 mS. Additionally or alternatively, an additional field may be added to the CSI-RS configuration in order to specify frequency-domain periodicity for the interference measurement REs.

In one embodiment, upon measuring the interference level, the terminal typically returns one or more scalar values that are indicative of the measured interference level on the various ports of the dedicated interference measurement CSI-RS resource. In other words, the reported scalar values correspond to the interference levels measured in different REs. In an embodiment, the scalar values represent the ratio between the measured interference level and some reference interference level. When the reference interference level is set to unity, the scalar values represent the absolute interference levels. Alternatively, the interference measurement may be used for CSI calculation in the terminal only, with no explicit feedback.

Although the embodiments described herein mainly address 3GPP LTE, the methods and systems described herein can also be used in other applications, such as in Wi-Fi systems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
controlling a plurality of transmission points, which are configured to operate in accordance with a Coordinated Multipoint (CoMP) transmission scheme, to transmit from the plurality of transmission points a same composite Reference Signal (RS) simultaneously with one another, coherently with one another and in the same time-frequency resource elements (REs) to a mobile communication terminal;
receiving from the terminal feedback, which is estimated in the terminal based on the composite RS that originated simultaneously and coherently from the plurality of the transmission points, the feedback being calculated in the terminal assuming a single-transmission-point transmission, but is indicative of a response of a composite communication channel between the plurality of the transmission points and the terminal; and
configuring subsequent transmission from the plurality of the transmission points based on the received feedback that was calculated in the terminal assuming the single-transmission-point transmission.

2. The method according to claim 1, wherein controlling the plurality comprises controlling multiple transmission points that are located at different geographical locations.

3. The method according to claim 1, wherein controlling the transmission points to transmit the composite RS comprises controlling the transmission points to transmit respective reference signals in a single pattern of the time-frequency Resource Elements (REs).

4. The method according to claim 1, wherein receiving the feedback comprises receiving an indication of a preferred precoding matrix, which is selected by the terminal from a codebook that is specified for single-transmission-point channels.

5. The method according to claim 1, wherein controlling the transmission points comprises transmitting two or more composite RSs, corresponding to respective different CoMP hypotheses, each CoMP hypothesis corresponding to a respective CoMP mode and a respective subset of the transmission points.

6. The method according to claim 5, wherein receiving the feedback and configuring the subsequent transmission comprise receiving the feedback relating to the two or more composite RSs, and selecting a CoMP hypothesis for transmitting the subsequent transmission based on the received feedback relating to the respective different CoMP transmission hypotheses.

7. The method according to claim 5, wherein receiving the feedback comprises receiving first feedback having a first data size for a first composite RS, and receiving second feedback having a second data size, different from the first data size, for a second composite RS.

8. The method according to claim 5, wherein transmitting the two or more composite RSs comprises transmitting each subset of the composite RSs in a separate sub-frame of a communication protocol used between the transmission points and the terminal.

9. The method according to claim 5, wherein transmitting the two or more composite RSs comprises assigning at least one of the composite RSs for interference measurement by the terminal.

10. The method according to claim 9, wherein receiving the feedback comprises receiving interference estimates for at least two respective time-frequency Resource elements (REs).

11. The method according to claim 5, wherein receiving the feedback comprises receiving an indication of a partial subset of the composite RSs for which the feedback is estimated by the terminal.

12. The method according to claim 11, wherein receiving the indication comprises receiving a jointly-encoded indication of the partial subset of the composite RSs and of a transmission rank associated with the feedback, and extracting the partial subset from the jointly-encoded indication.

13. The method according to claim 1, wherein transmitting the composite RS comprises sending to the terminal signaling information that specifies time-frequency Resource Elements (REs) containing the composite RS.

14. Apparatus, comprising:
an interface, which is configured to communicate with a plurality of transmission points that operate in accordance with a Coordinated Multipoint (CoMP) transmission scheme; and
at least one processor, which is configured to control the plurality of the transmission points to transmit from the plurality of transmission points a same composite Reference Signal (RS) simultaneously with one another, coherently with one another and in the same time-frequency resource elements (REs) to a mobile communication terminal, to receive from the terminal feedback, which is estimated in the terminal based on the composite RS that originated simultaneously and coherently from the plurality of the transmission points, the feedback being calculated in the terminal assuming a single-transmission-point transmission, but is indicative of a response of a composite communication channel between the plurality of the transmission points and the terminal, and to configure subsequent transmission from the plurality of the transmission points based on the received feedback that was calculated in the terminal assuming the single-transmission-point transmission.

15. The apparatus according to claim 14, wherein the processor is configured to control the transmission points to transmit respective reference signals in a single pattern of the time-frequency Resource Elements (REs).

16. The apparatus according to claim 14, wherein the processor is configured to receive in the feedback an indication of a preferred precoding matrix, which is selected by the terminal from a codebook that is specified for single-transmission-point channels.

17. The apparatus according to claim 14, wherein the processor is configured to control the transmission points to transmit to the terminal two or more composite RSs, corresponding to respective different CoMP hypotheses, each CoMP hypothesis corresponding to a respective CoMP mode and a respective subset of the multiple transmission points.

18. The apparatus according to claim 17, wherein the processor is configured to receive the feedback relating to the two or more composite RSs, and to select a CoMP hypothesis for transmitting the subsequent transmission based on the received feedback relating to the respective different CoMP transmission hypotheses.

19. The apparatus according to claim 17, wherein the processor is configured to assign at least one of the composite RSs for interference measurement by the terminal.

20. The apparatus according to claim 14, wherein the processor is configured to transmit to the terminal signaling information that specifies time-frequency Resource Elements (REs) containing the composite RS.

* * * * *